(No Model.)   F. G. & A. C. SARGENT.   2 Sheets—Sheet 1.
WOOL WASHING MACHINE.
No. 291,089.   Patented Jan. 1, 1884.
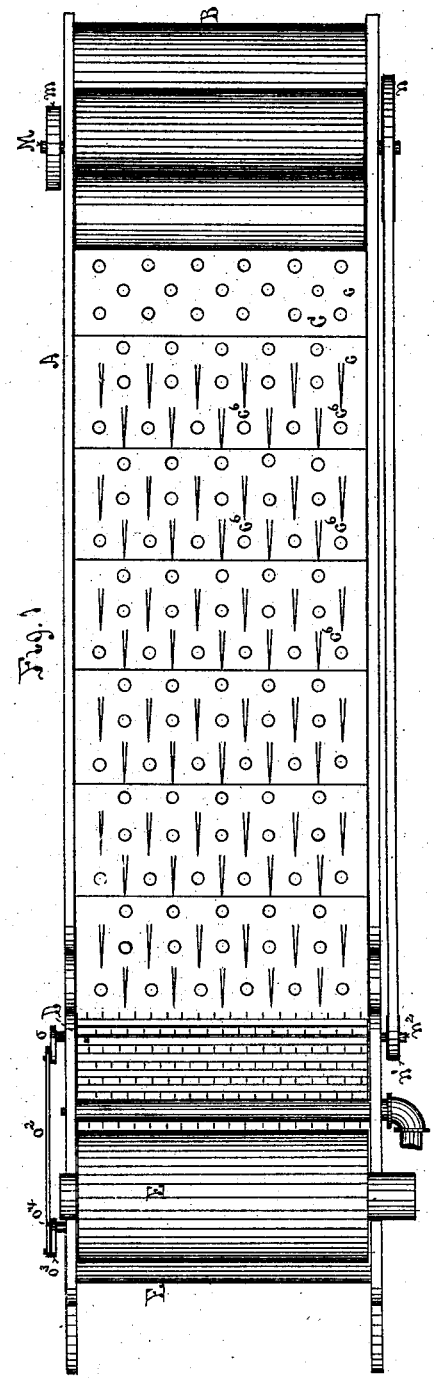
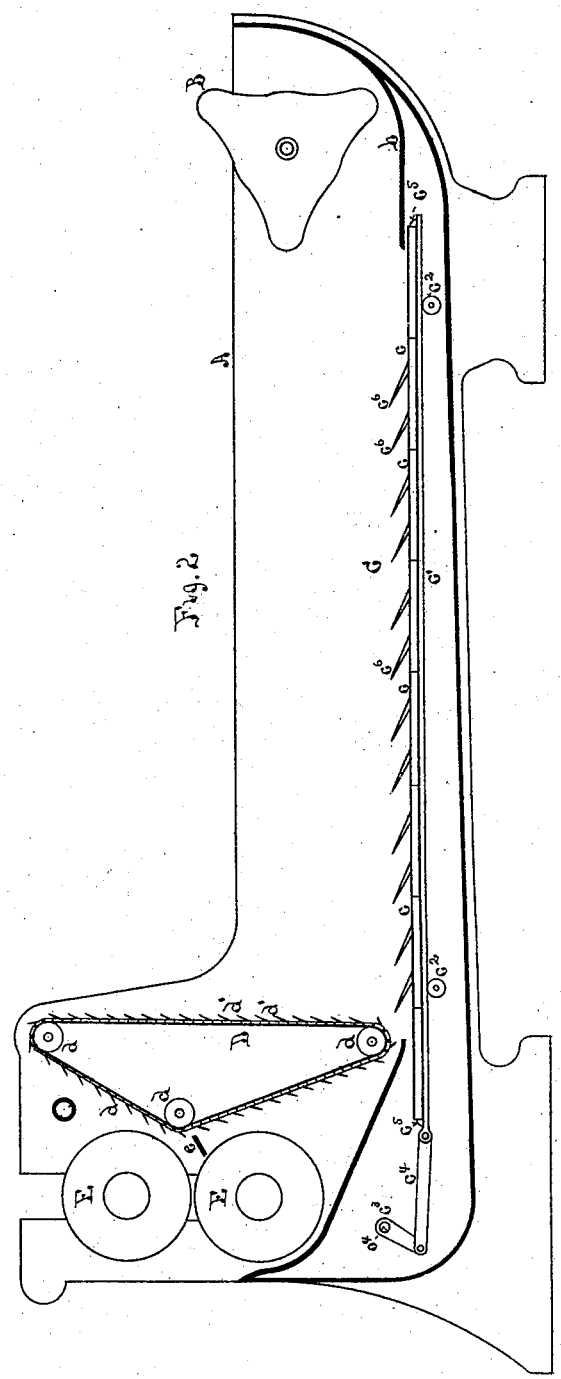

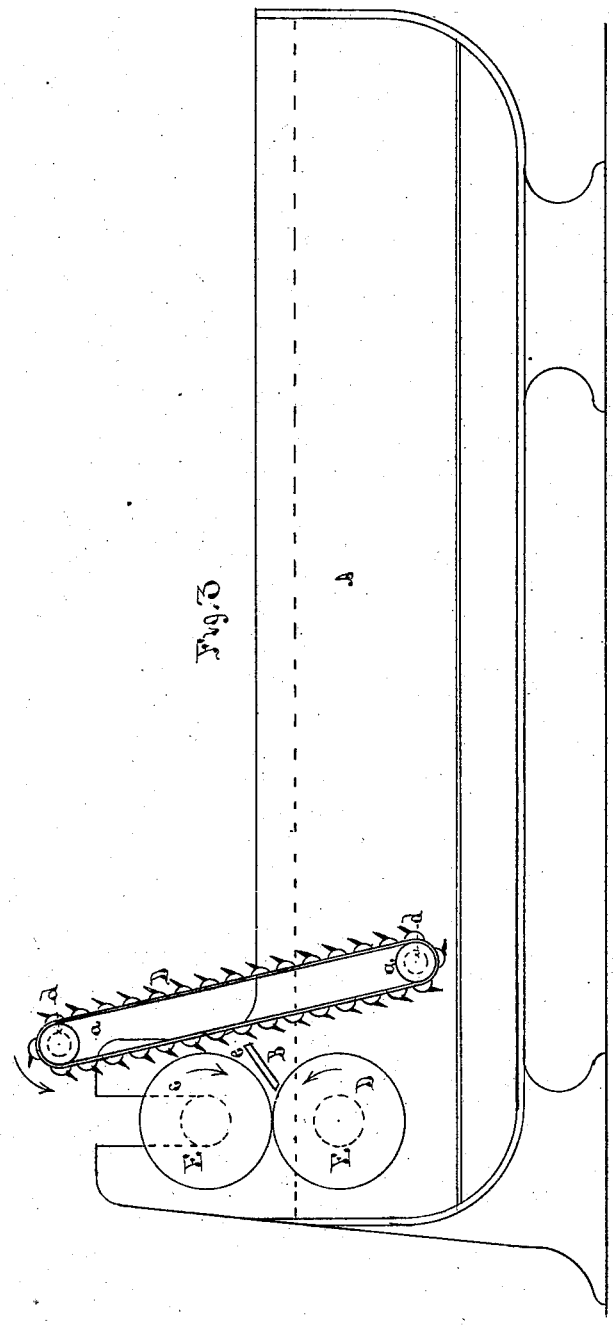

UNITED STATES PATENT OFFICE.

FREDERICK G. SARGENT AND ALLAN C. SARGENT, OF GRANITEVILLE, MASSACHUSETTS.

WOOL-WASHING MACHINE.

SPECIFICATION forming part of Letters Patent No. 291,089, dated January 1, 1884.

Application filed December 20, 1882. (No model.)

*To all whom it may concern:*

Be it known that we, FREDERICK G. SARGENT and ALLAN C. SARGENT, of Graniteville, in the county of Middlesex and State of Massachusetts, have invented a new and useful Improvement in Wool-Washing Machines, of which the following is a specification.

Our invention is an improved adaptation of feeding-aprons similar to that shown in our Letters Patent No. 266,900, granted October 31, 1882, for use in wool-washing machines; and it consists in combining said feeding-apron with a pair of squeeze-rolls and chute to enable it to deliver the wool to the squeeze-rolls; secondly, in combining such apron with a toothed reciprocating platform forming the bottom of the bowl upon which the wool rests while being washed; thirdly, in forming the toothed reciprocating bottom in removable sections, so as to enable it to be easily taken out for the purpose of cleaning the bowl.

In the drawings, Figure 1 is a top plan view of the wool-washer provided with our improvement. Fig. 2 is a longitudinal vertical section of the same. Fig. 3 is a longitudinal vertical section, showing a modification of the feeding-apron.

A is the bowl of the machine, constructed to contain the liquid for washing the wool.

B is a feed-roll, fluted, to carry the wool downward into the machine as it is fed between it and the end of the bowl.

C is a false bottom of the bowl, made of a series of removable platforms, $c\,c$, resting upon side bars, $c'$, extending parallel with and a short distance from each side of the machine upon rollers $c^2$. These bars are made to reciprocate by the cranks $c^3$ and links $c^4$, connected to them. The platforms $c$ are of just sufficient length to pass within the sides of the bowl, and are held in place upon the bars $c'$ by stops $c^5$, attached to each end of each bar. A curved platform, $b$, extends from beneath the feed-roller B over the bottom C. The platforms $c$ are provided with teeth $c^6$, projecting upward at an incline in the direction of the feed-rolls, and which, by the reciprocal action of the bottom C, carry the wool gradually forward through the liquid in the bowl to the feed-apron D as the wool continually sinks down upon the bottom, and in the backward movement of the platform the specific gravity of the wool causes it to rise and the teeth $c^6$ to pass under it without carrying it backward, so far as the forward movement of the bottom advances it. This action of the reciprocating bottom causes the wool to be thoroughly saturated with the liquid and opened up before reaching the feed-apron, and causes it to be fed to the latter more uniformly as well as more thoroughly washed. This construction of the reciprocating bottom C enables its different platforms $c\,c$ to be readily removed for cleaning dirt and impurities from the bowl which may have settled beneath the platform during the washing process, and facilitates the clearing of the bottom C itself. Through the platforms $c$ holes are made, to allow dirt and impurities to pass through and rest upon the stationary bottom of the bowl A. The platforms $c$ are made of material heavy enough to retain their position upon the bar $c'$; or they may be secured by bolts or other ordinary means, if desired.

The feed-apron D passes over rollers $d\,d$ upward in a vertical direction and downward past the squeeze-rollers E E and the chute $e$. The squeeze-rolls and chute are so placed as to be far enough below the upper roller, $d$, to allow the teeth $d'$ upon the feed-apron to assume an inclined position downward and allow the wool to drop off of the apron onto the chute $e$, down which it slides and passes between the squeeze-rolls. To effect this the teeth or spines $d'$ must be inclined at an acute angle to the face of the apron D. The upper squeeze-roll E is placed near enough to the spines $d'$ to allow it to doff the wool from the spines which fails to drop off, the surface of the squeeze-rolls moving faster than the apron. The combined action of the reciprocating platform C and apron D serves to cause the latter to take up the wool very evenly and successively, in small quantities, on the spines $d'$ as it floats in the liquid in the bowl, and the apron D, passing above the liquid over the upper roller, $d$, and thence downward toward the squeeze-rolls, causes all surplus liquor and dirt to drain from the wool while it is in an open condition suitable to allow its escape, and it thus forms a very effective wool-washing machine.

Fig. 3 shows a feed-apron carried over only two rollers, $d$, and so located to the squeeze-rolls and chute $e$, as to allow the wool to drop off very readily. The slats which form this apron are round on their outer surfaces, and present no corners or means by which the wool can catch upon them and be prevented from dropping upon the chute $e$. The feed-roll B is mounted upon a shaft, M, driven by pulley $m$, and upon the opposite end of the shaft is attached the pulley $n$. The latter is bolted to a pulley, $n'$, upon the shaft $n^2$. On the opposite end of the shaft is a crank, $o$, connected by a link, $o^2$, to crank $o^3$, which is mounted upon the shaft $o^4$, passing through the bowl of the machine, to which the cranks $c^3$ are attached for reciprocating the false bottom C.

If it be desired, the position of the rollers $d$ shown in Fig. 2 may be somewhat changed, so as to cause the feed-apron D to deliver the wool to the squeeze-rolls E E at the same place as the chute $e$ delivers it, and thus the chute may be dispensed with; but the use of the chute we consider preferable.

What we claim as new and of our invention is—

1. In a wool-washing machine, the combination of the bowl A, squeeze-rolls E E, and the vertical feed-apron D, moving at an incline downward toward the nip of said rolls, substantially as described.

2. The combination of the vertical downward-delivery feed-apron D, the chute $e$, the squeeze-rolls E E, and the bowl A, substantially as described.

3. The combination, with the bowl A, of the reciprocating bottom C, provided with teeth $c^6$, and the feed-apron D, substantially as described.

4. The combination of the reciprocating carrier C, provided with teeth $c^6$, the feed-apron D, and the squeeze-rolls E E, substantially as described.

5. In combination with the bowl A, the reciprocating bottom C, formed of platforms $c$ $c$ and bars $c'$, substantially as described.

6. The combination of the feed-roll B, the reciprocating bottom C, provided with teeth $c^6$, feed-apron D, and the squeeze-rolls E E, substantially as described.

FREDERICK G. SARGENT.
A. C. SARGENT.

Witnesses:
DAVID HALL RICE,
N. P. OCKINGTON.